US012794327B2

(12) United States Patent
Nagai et al.

(10) Patent No.: US 12,794,327 B2
(45) Date of Patent: Nov. 10, 2026

(54) MOTOR WITH BUS BAR UNIT AND MANUFACTURING METHOD THEREOF

(71) Applicant: MITSUBA Corporation, Gunma (JP)

(72) Inventors: Takahiro Nagai, Gunma (JP); Yuta Suzuki, Gunma (JP); Kazuaki Kobayashi, Gunma (JP); Dai Yamamoto, Gunma (JP); Keita Nakabayashi, Gunma (JP)

(73) Assignee: MITSUBA Corporation, Gunma (JP)

( * ) Notice: Subject to any disclaimer, the term of this patent is extended or adjusted under 35 U.S.C. 154(b) by 158 days.

(21) Appl. No.: 18/713,693

(22) PCT Filed: Sep. 14, 2023

(86) PCT No.: PCT/JP2023/033526
§ 371 (c)(1),
(2) Date: May 27, 2024

(87) PCT Pub. No.: WO2024/127755
PCT Pub. Date: Jun. 20, 2024

(65) Prior Publication Data

US 2026/0135417 A1 May 14, 2026

(30) Foreign Application Priority Data

Dec. 16, 2022 (JP) ................................ 2022-201168

(51) Int. Cl.
*H02K 3/38* (2006.01)
*H02K 3/46* (2006.01)
(Continued)

(52) U.S. Cl.
CPC ............ *H02K 15/062* (2013.01); *H02K 3/38* (2013.01); *H02K 3/46* (2013.01); *H02K 3/522* (2013.01);
(Continued)

(58) Field of Classification Search
CPC ........... H02K 3/32; H02K 3/325; H02K 3/34; H02K 3/345; H02K 3/38; H02K 3/46;
(Continued)

(56) References Cited

U.S. PATENT DOCUMENTS

2017/0310193 A1* 10/2017 Ryu ......................... H02K 3/32
2022/0200387 A1* 6/2022 Yang ...................... H02K 3/522

FOREIGN PATENT DOCUMENTS

JP 2008312277 A * 12/2008
JP 2009290921 12/2009
(Continued)

OTHER PUBLICATIONS

Hashimoto, Machine Translation of JP2008312277, Dec. 2008 (Year: 2008).*
(Continued)

*Primary Examiner* — Eric Johnson
(74) *Attorney, Agent, or Firm* — JCIPRNET

(57) ABSTRACT

The present invention provides a motor and a manufacturing method thereof that can firmly fix an insulator and appropriately suppress vibration during driving. A motor 1 includes: a cylindrical stator 3 that has a cylindrical insulator 11 with insulating properties in which a plurality of winding portions 11*d* are arranged in the circumferential direction, and a plurality of winding coils 12 provided on each winding portion 11*d* of the insulator 11; a rotor 2 that is rotatably disposed inside the stator 3; and an annular bus bar unit 7 that supplies power to the plurality of winding coils 12. The bus bar unit 7 is fixed to one end side of the insulator 11.

9 Claims, 14 Drawing Sheets

(51) Int. Cl.
*H02K 3/52* (2006.01)
*H02K 15/062* (2025.01)

(52) U.S. Cl.
CPC ..... *H02K 2203/09* (2013.01); *H02K 2203/12* (2013.01)

(58) Field of Classification Search
CPC ............ H02K 3/346; H02K 3/50; H02K 3/52; H02K 3/521; H02K 3/522; H02K 2203/06; H02K 2203/09; H02K 2203/12
See application file for complete search history.

(56) References Cited

FOREIGN PATENT DOCUMENTS

| | | | | | |
|---|---|---|---|---|---|
| JP | 2013042633 | | | 2/2013 | |
| JP | 2016213916 | | | 12/2016 | |
| JP | 2019097261 | | | 6/2019 | |
| JP | 2021058011 | | | 4/2021 | |
| KR | 20220025768 | A | * | 3/2022 | ............. H02K 3/345 |
| KR | 20220085294 | A | * | 6/2022 | ............. H02K 3/345 |

OTHER PUBLICATIONS

Shimomura, Machine Translation of JP2016213916, Dec. 2016 (Year: 2016).*
Suzuki, Machine Translation of JP2019097261, Jun. 2019 (Year: 2019).*
Choi, Machine Translation of KR20220025768, Mar. 2022 (Year: 2022).*
Kang, Machine Translation of KR20220085294, Jun. 2022 (Year: 2022).*
"International Search Report (Form PCT/ISA/210) of PCT/JP2023/033526", mailed on Dec. 5, 2023, pp. 1-3.
"International Preliminary report on patentability (Form PCT/IB/338) mailed on Jun. 26, 2025, International Preliminary report on patentability (Form PCT/IB/373) issued Jun. 12, 2025, Written Opinion (Form PCT/ISA/237) with English translation thereof mailed on Dec. 5, 2023, and International Preliminary report on patentability (Form PCT/IB/326) mailed on Jun. 26, 2025 of PCT/JP2023/033526", pp. 1-11.
"Examination report of India Counterpart Application", issued on Jul. 6, 2026, p. 1-p. 5.

* cited by examiner

MOTOR WITH BUS BAR UNIT AND MANUFACTURING METHOD THEREOF

CROSS-REFERENCE TO RELATED APPLICATION

This application is a 371 application of the International PCT application serial no. PCT/JP2023/033526, filed on Sep. 14, 2023, which claims the priority benefits of Japan Patent Application No. 2022-201168, filed on Dec. 16, 2022. The entirety of each of the above-mentioned patent applications is hereby incorporated by reference herein and made a part of this specification.

TECHNICAL FIELD

The present invention relates to a motor, such as a so-called brushless motor, and a manufacturing method thereof.

RELATED ART

In recent years, efforts to promote the Sustainable Development Goals (2030 Agenda for Sustainable Development, adopted by the United Nations Summit on Sep. 25, 2015, hereinafter referred to as "SDGs") have been made on an international scale. Specifically, the SDGs include "Goal 9: Industry, Innovation and Infrastructure" and "Goal 12: Responsible Consumption and Production," and there is a desire for technological development aimed at achieving these goals.

The technology described in Patent Document 1 is known as a technology that can contribute to achieving these goals. Patent Document 1 describes a motor in which "the bus bar holder 232A that holds the bus bar 231A has an annular holder main body portion 60A, and a first leg portion 61A and a second leg portion 62A extending downward from the holder main body portion 60A. The first leg portion 61A has a claw portion 611A that protrudes laterally. The upper surface of the claw portion 611A and the lower surface of a receiving portion 521A provided on the insulator 52A face each other in the axial direction with a gap therebetween. Therefore, upward movement of the bus bar holder 232A is restricted by the claw portion 611A and the receiving portion 521A of the insulator 52A. On the other hand, the lower end portion of the second leg portion 62A abuts against the tooth 512A or the insulator 52A."

CITATION LIST

Patent Document

[Patent Document 1] Japanese Patent Application Laid-Open No. 2013-42633

SUMMARY OF INVENTION

Technical Problem

In the motor described in Patent Document 1, although the claw portion 611A protruding laterally from the first leg portion 61A of the bus bar holder 232A engages with the receiving portion 521A of the insulator 52A to restrict the upward movement of the bus bar holder 232A, there are only three first leg portions 61 formed around the circumferential direction of the bus bar holder 232A, and the first leg portions 61 are provided at positions outside the inner peripheral surfaces of the teeth 512A. Therefore, the insulator cannot be firmly fixed, which poses the problem that the vibration that may occur when the motor is driven cannot be appropriately suppressed.

The present invention has been made to solve the above-mentioned problem, and an object of the present invention is to provide a motor and a manufacturing method thereof that can firmly fix the insulator and appropriately suppress vibration during driving.

Solution to Problem

The present invention provides a motor, including: a cylindrical stator that has a cylindrical insulator with insulating properties in which a plurality of winding portions are arranged in a circumferential direction, and a plurality of winding coils provided on each winding portion of the insulator; a rotor that is rotatably disposed inside the stator; and an annular bus bar unit that supplies power to the plurality of winding coils, in which the bus bar unit is fixed to one end side of the insulator.

Effects of Invention

According to the present invention, it is possible to firmly fix the insulator and appropriately suppress vibration during driving.

Figure 9:
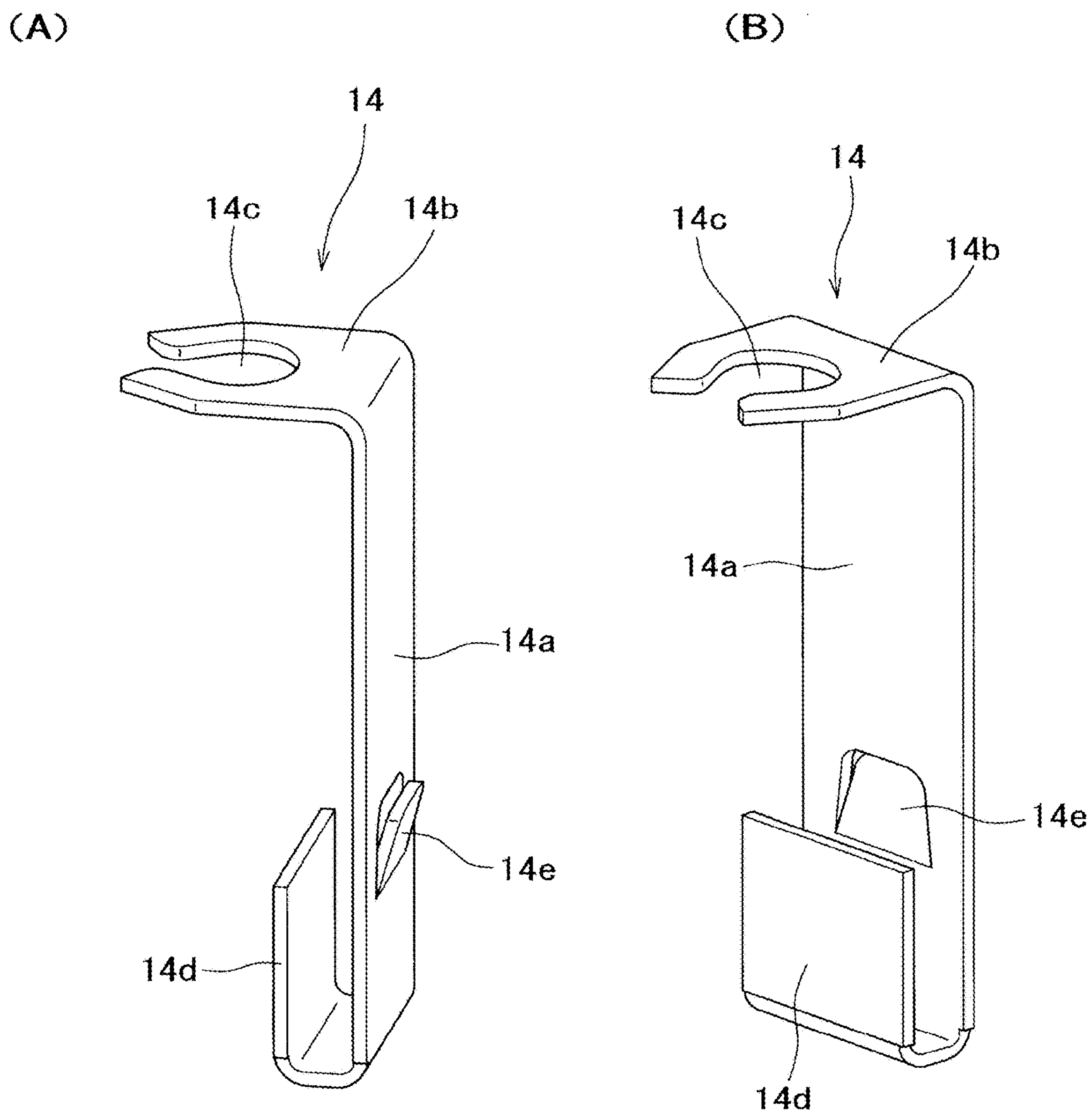

(A) and (B) of FIG. 9 are views showing a leaf spring material of the motor, wherein (A) is a perspective view from the outside and (B) is a perspective view from the inside.

Figure 10:
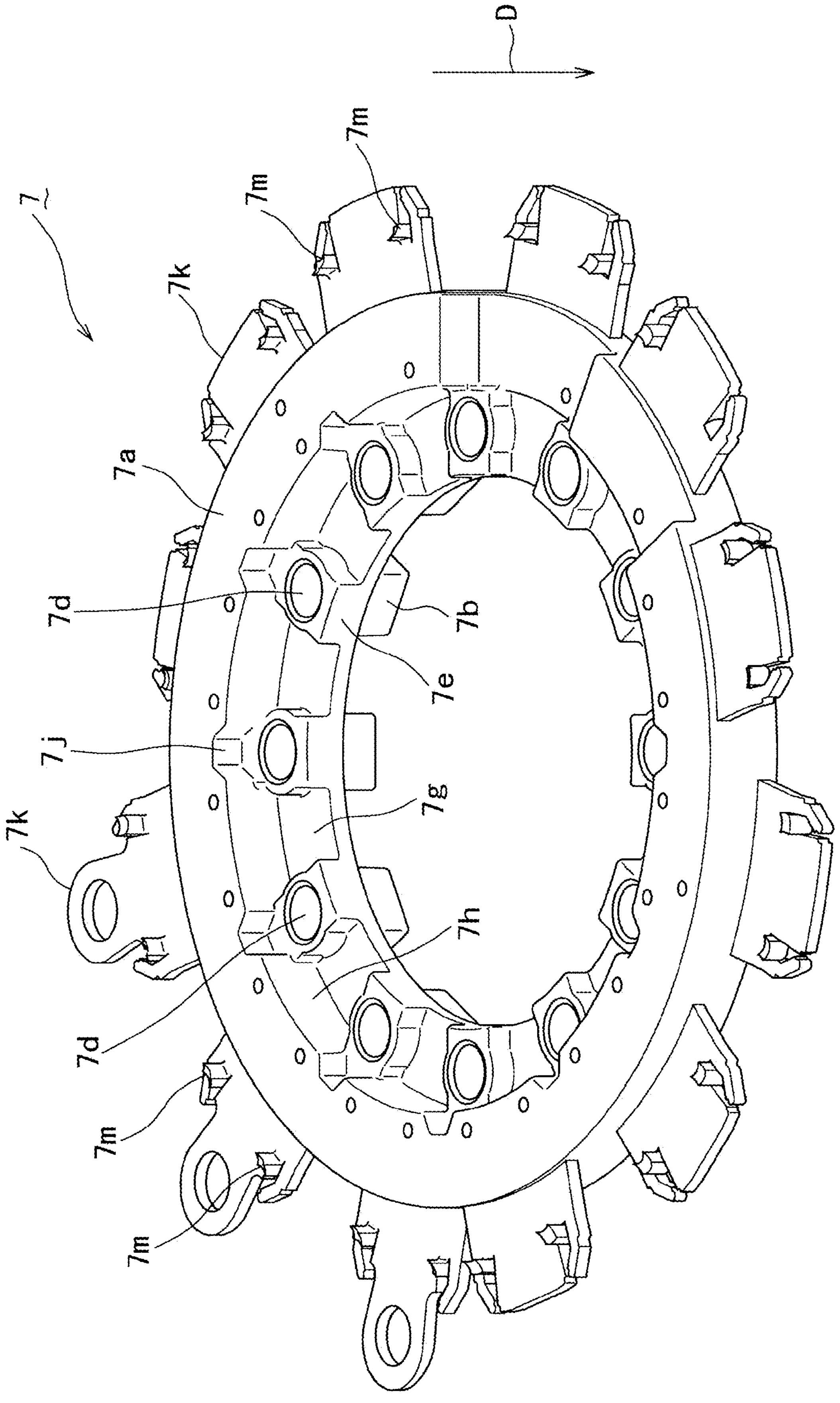

FIG. 10 is a perspective view showing a bus bar unit of the motor from the rear side.

Figure 11:
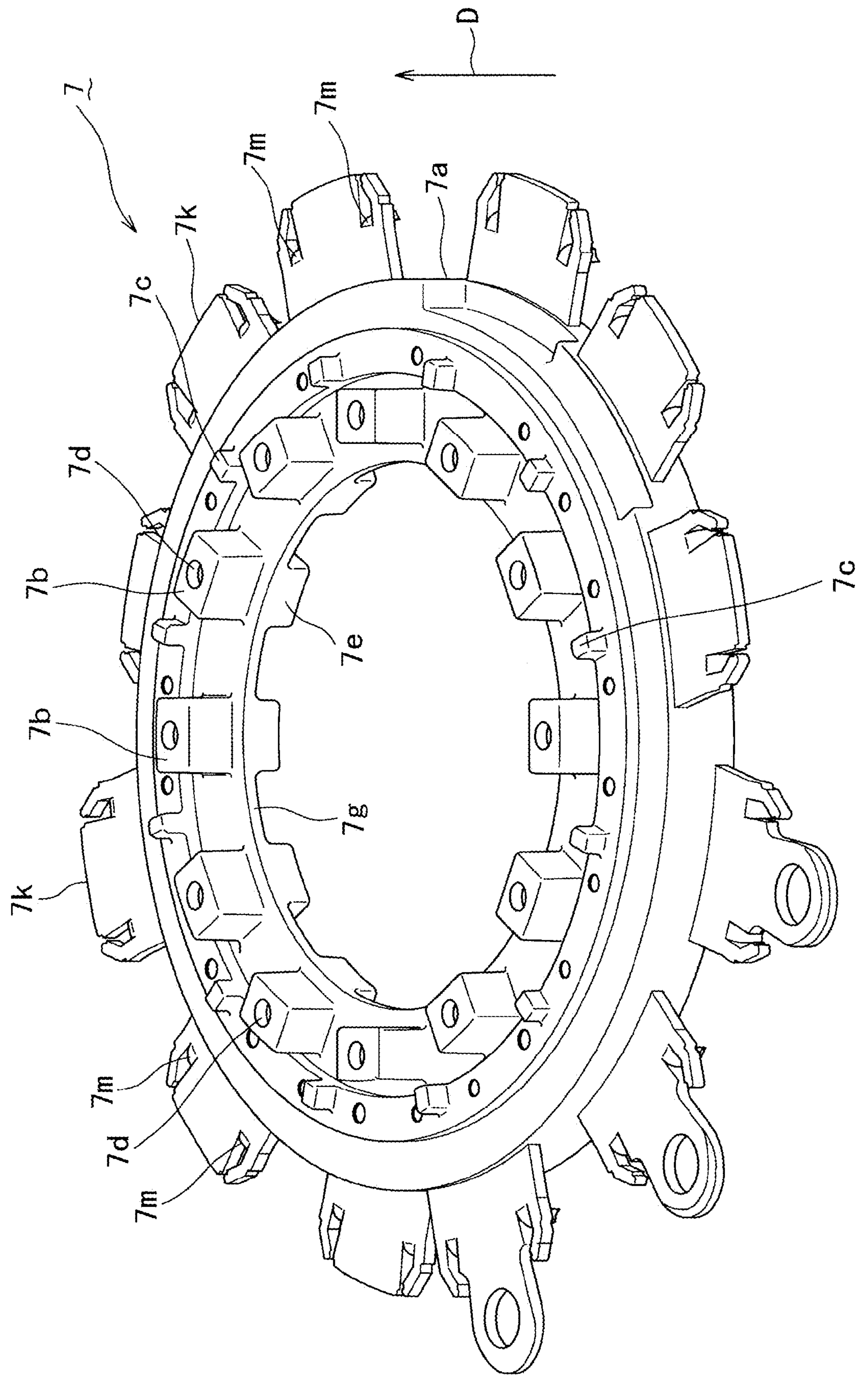

FIG. 11 is a perspective view showing the bus bar unit from the front side.

Figure 12:
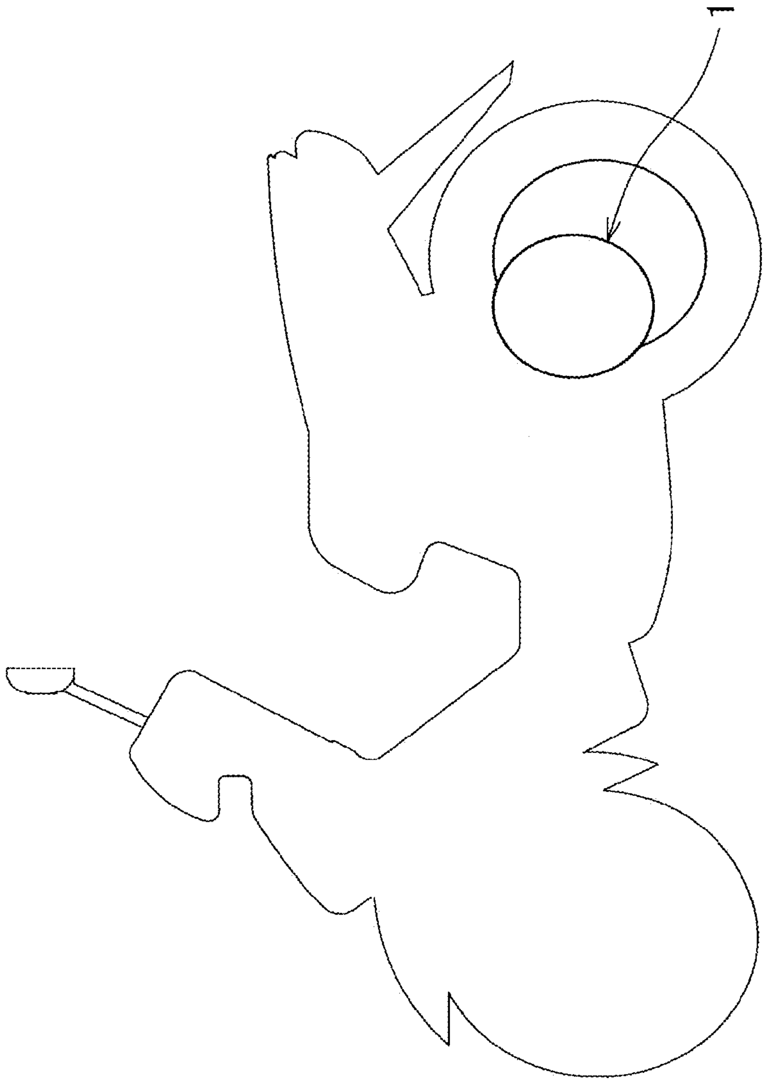

FIG. 12 is a schematic view showing a state where the motor is attached to a side-mounted electric motorcycle.

Figure 13:
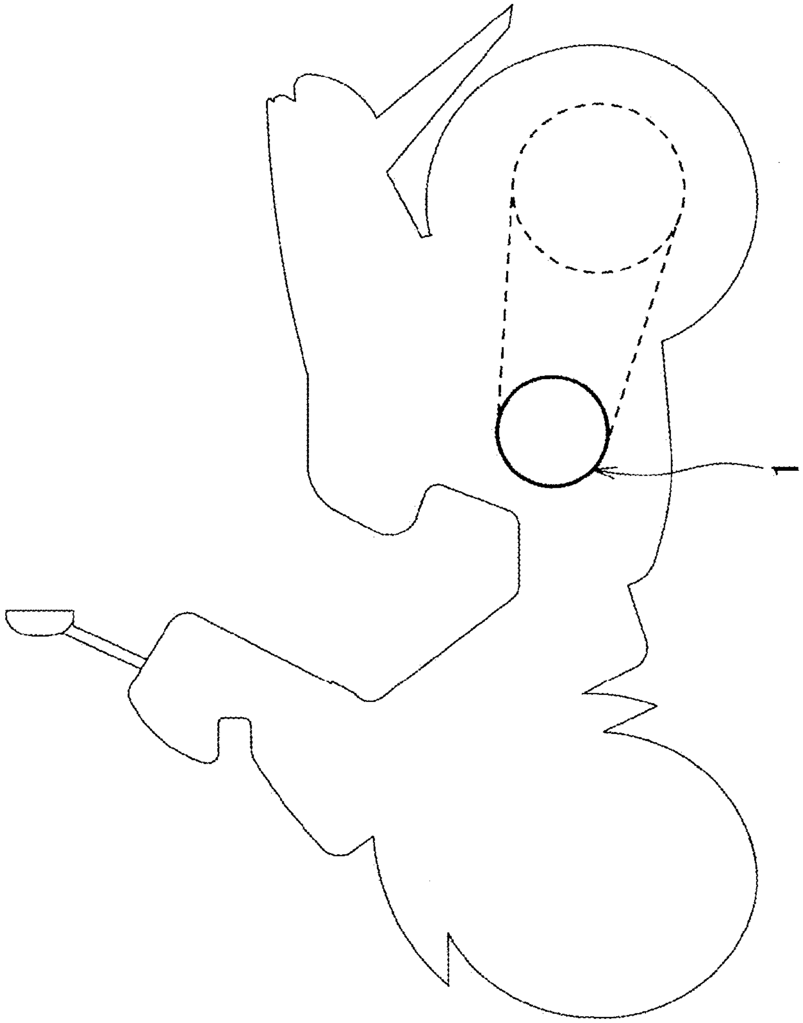

FIG. 13 is a schematic view showing a state where the motor is attached to a center-mounted electric motorcycle.

Figure 14:
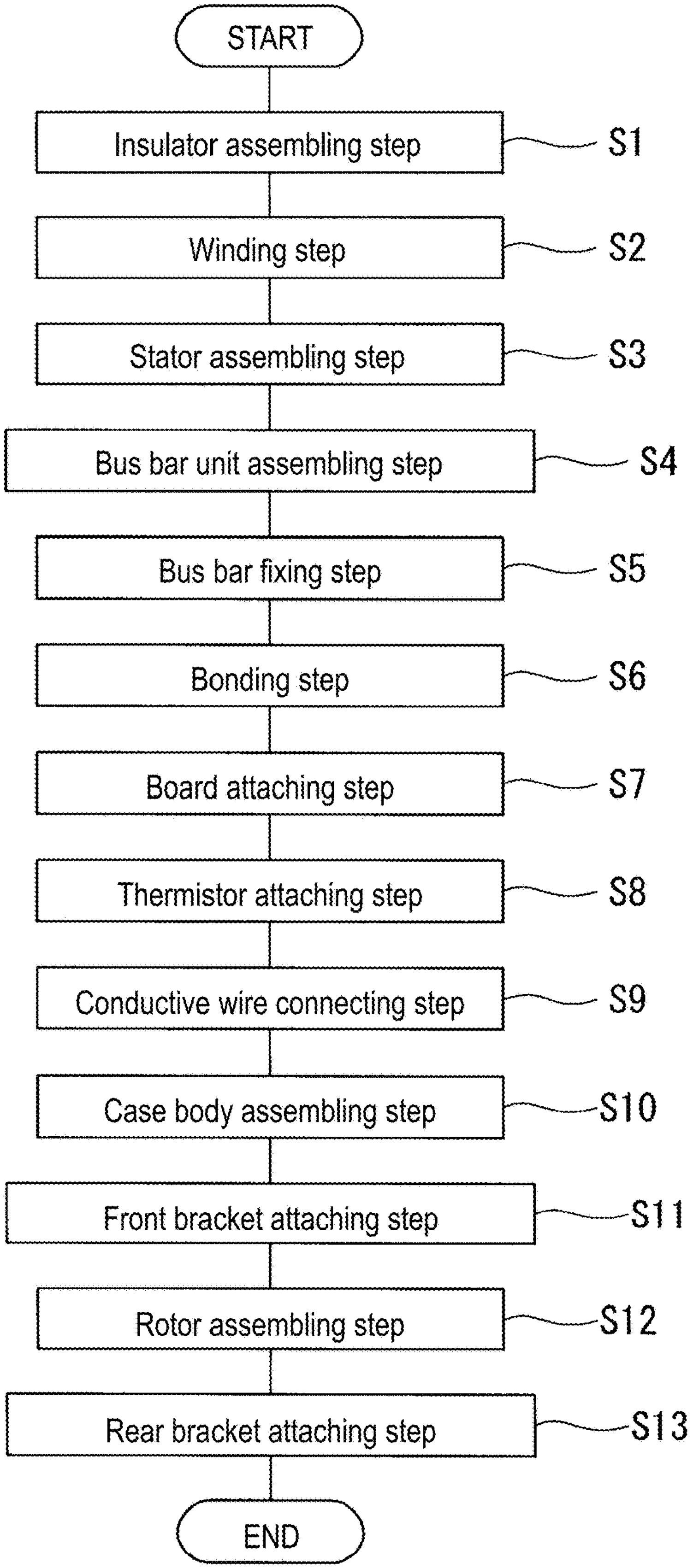

FIG. 14 is a process diagram showing manufacturing steps of the motor.

DESCRIPTION OF EMBODIMENTS

One Embodiment

Figure 1:
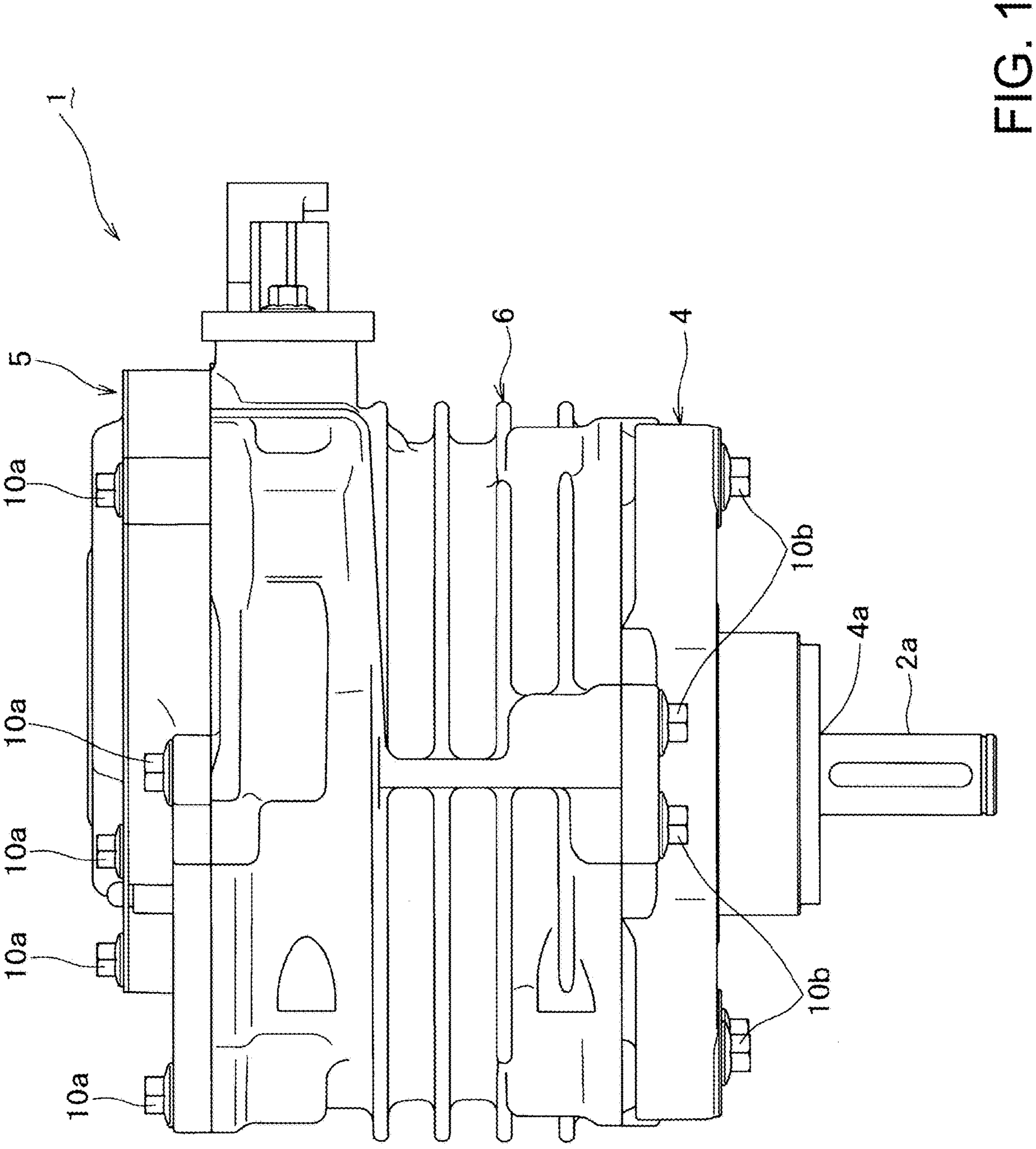
FIG. 1 is a side view showing a motor according to an embodiment of the present invention.
Figure 2:
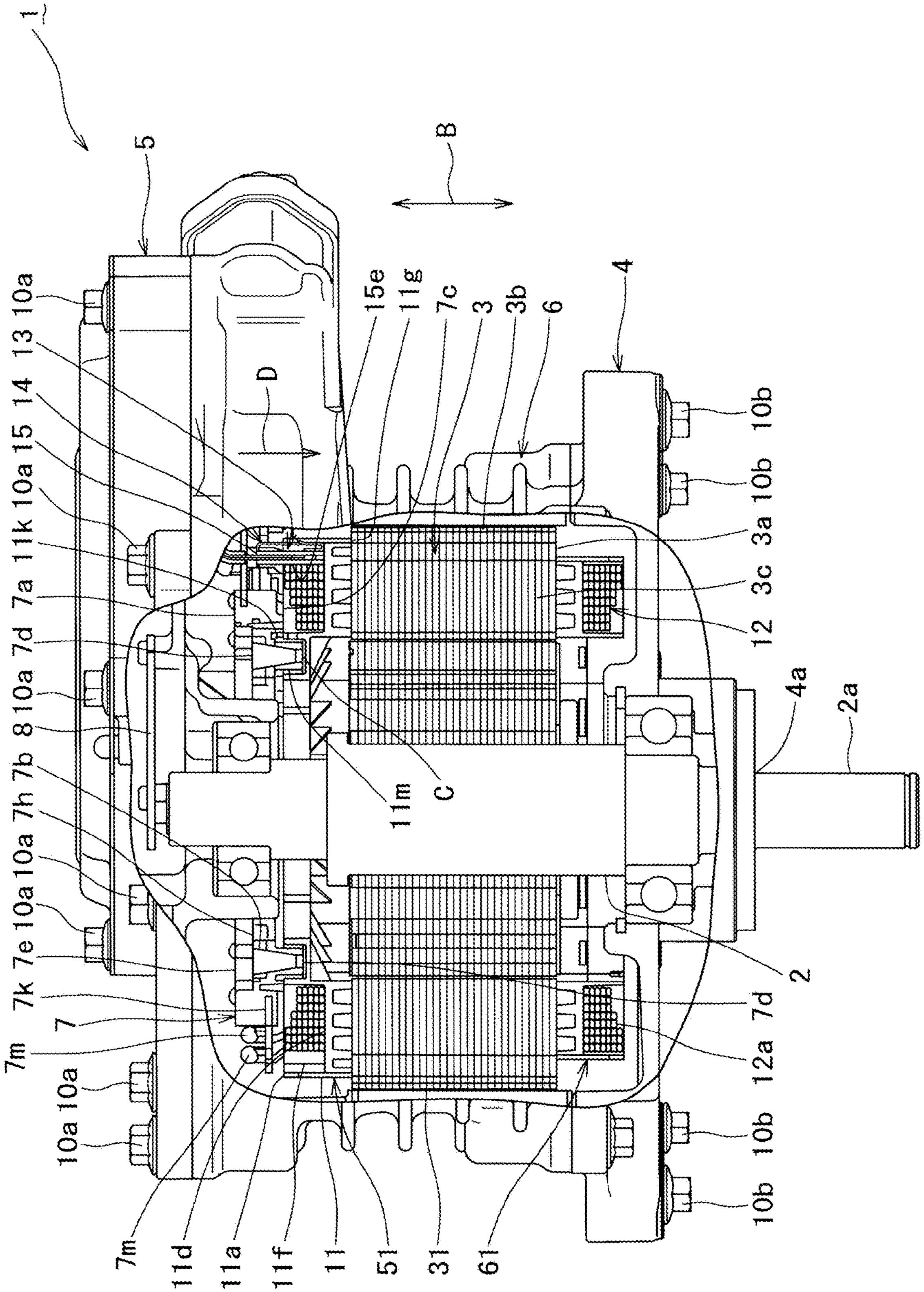
FIG. 2 is a cross-sectional view of the motor with a portion cut away in the axial direction.
Figure 3:
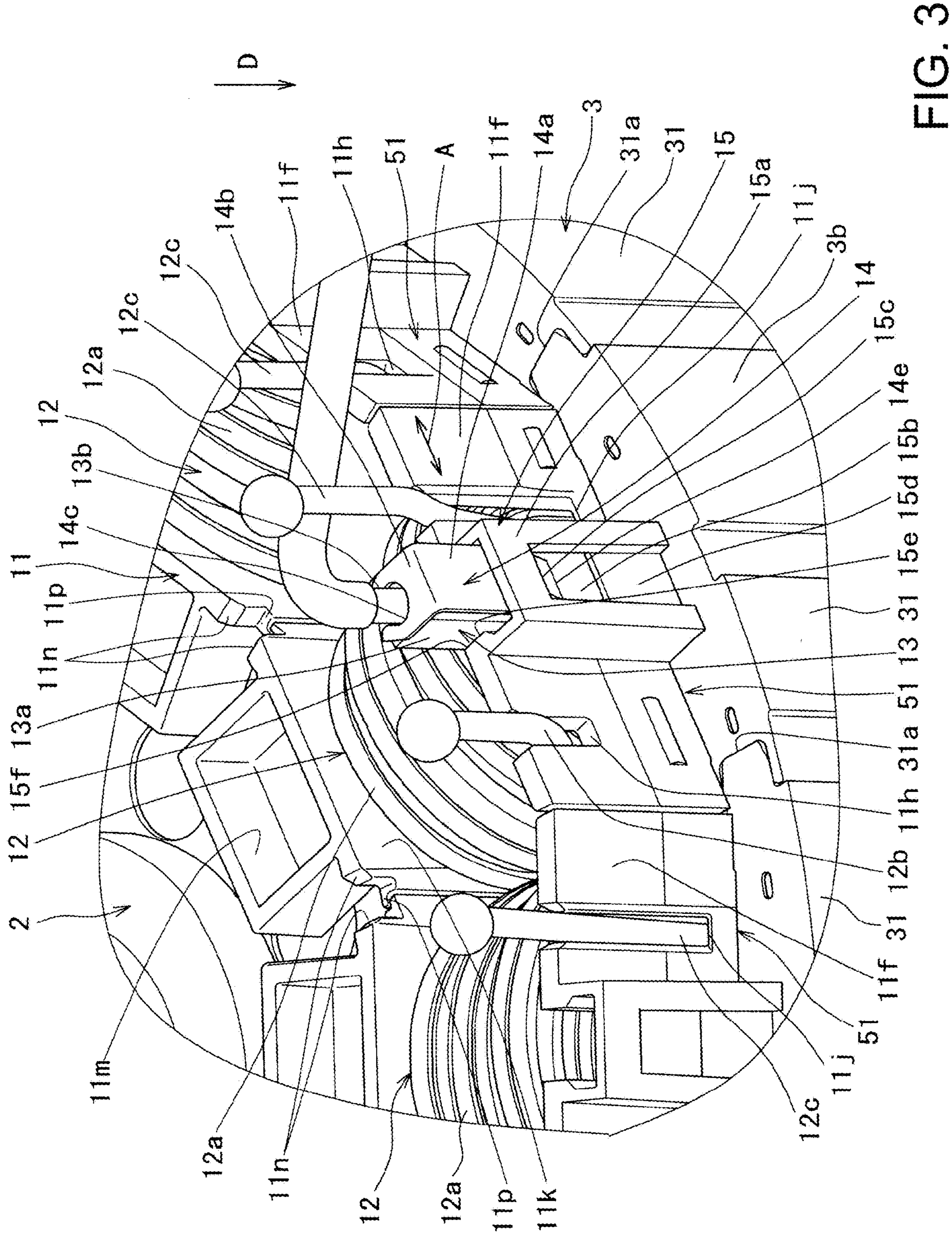
FIG. 3 is a partial perspective view of the motor.
Figure 4:
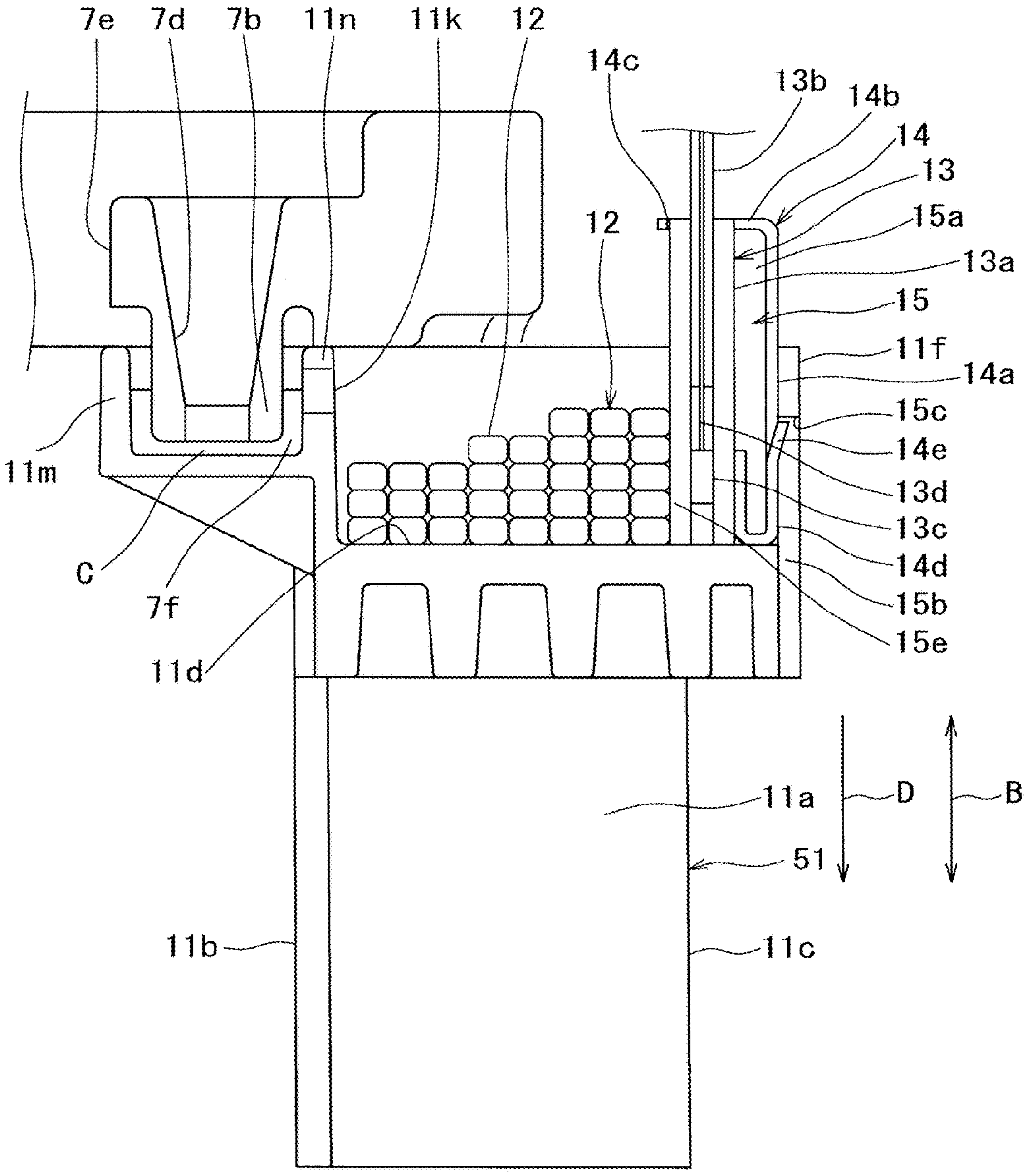
FIG. 4 is a partial radial cross-sectional view of the motor.
Figure 5:
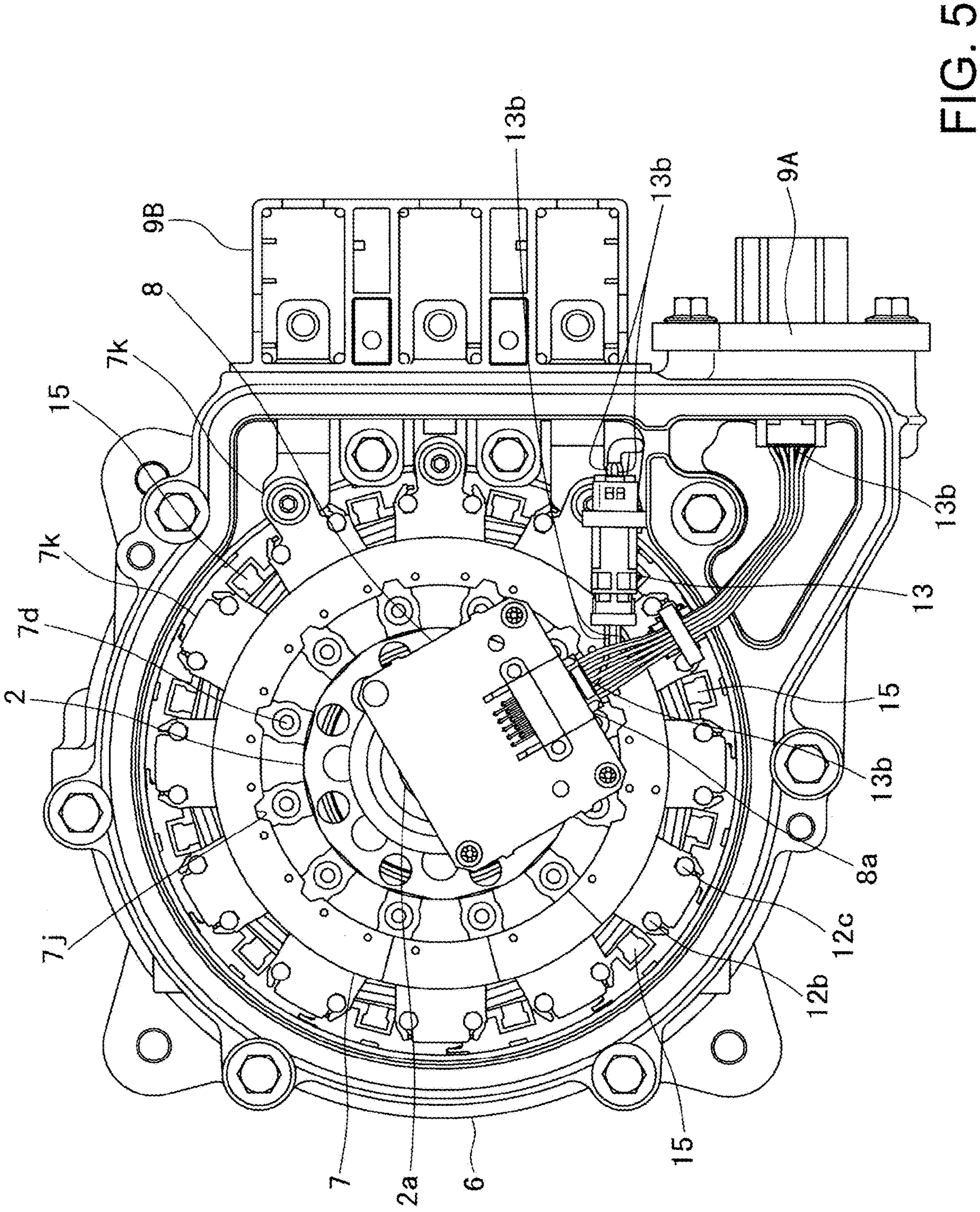
FIG. 5 is a partial axial cross-sectional view of the motor.
Figure 6:
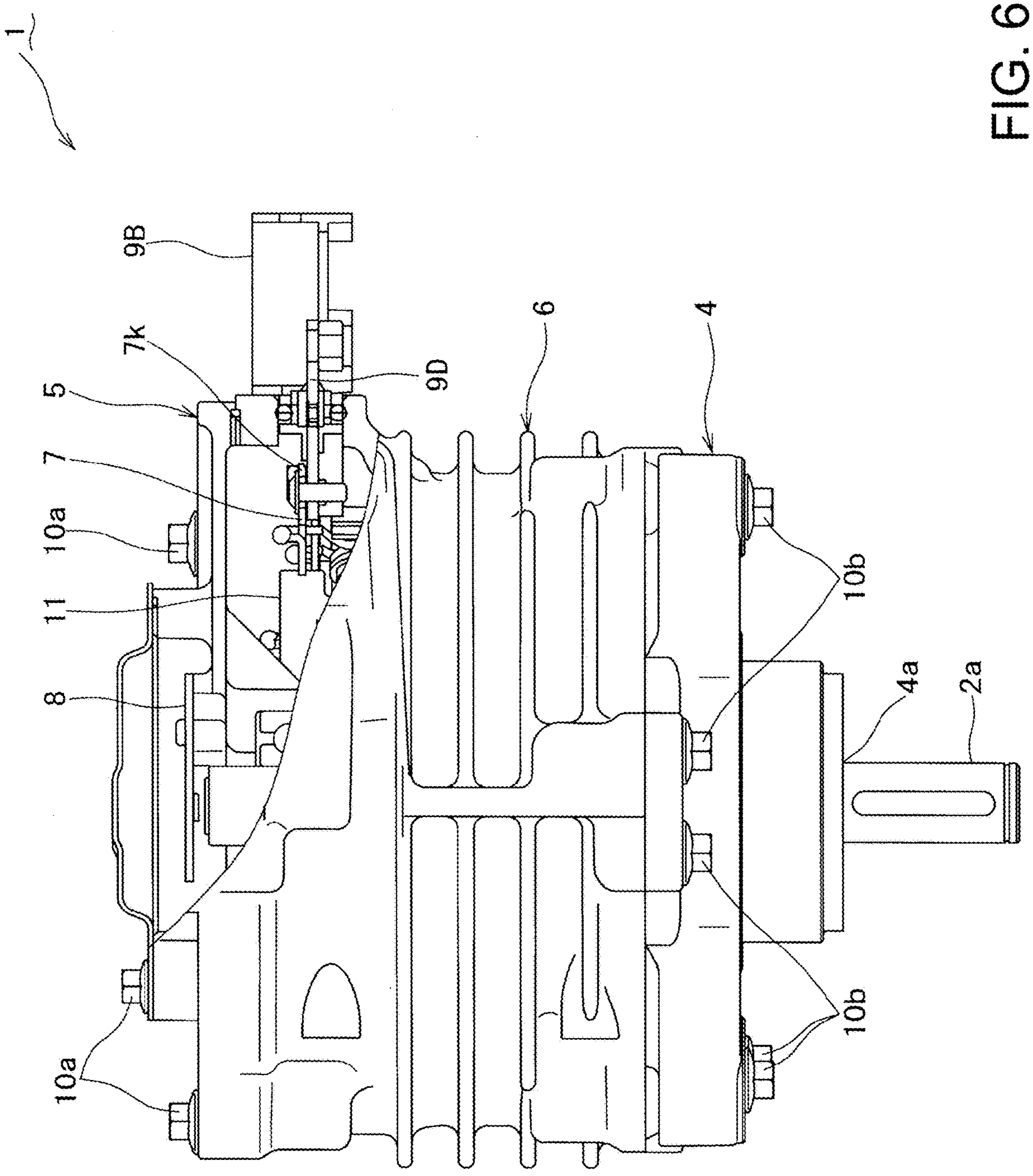
FIG. 6 is a side view of the motor with a portion cut away.
Figure 7:
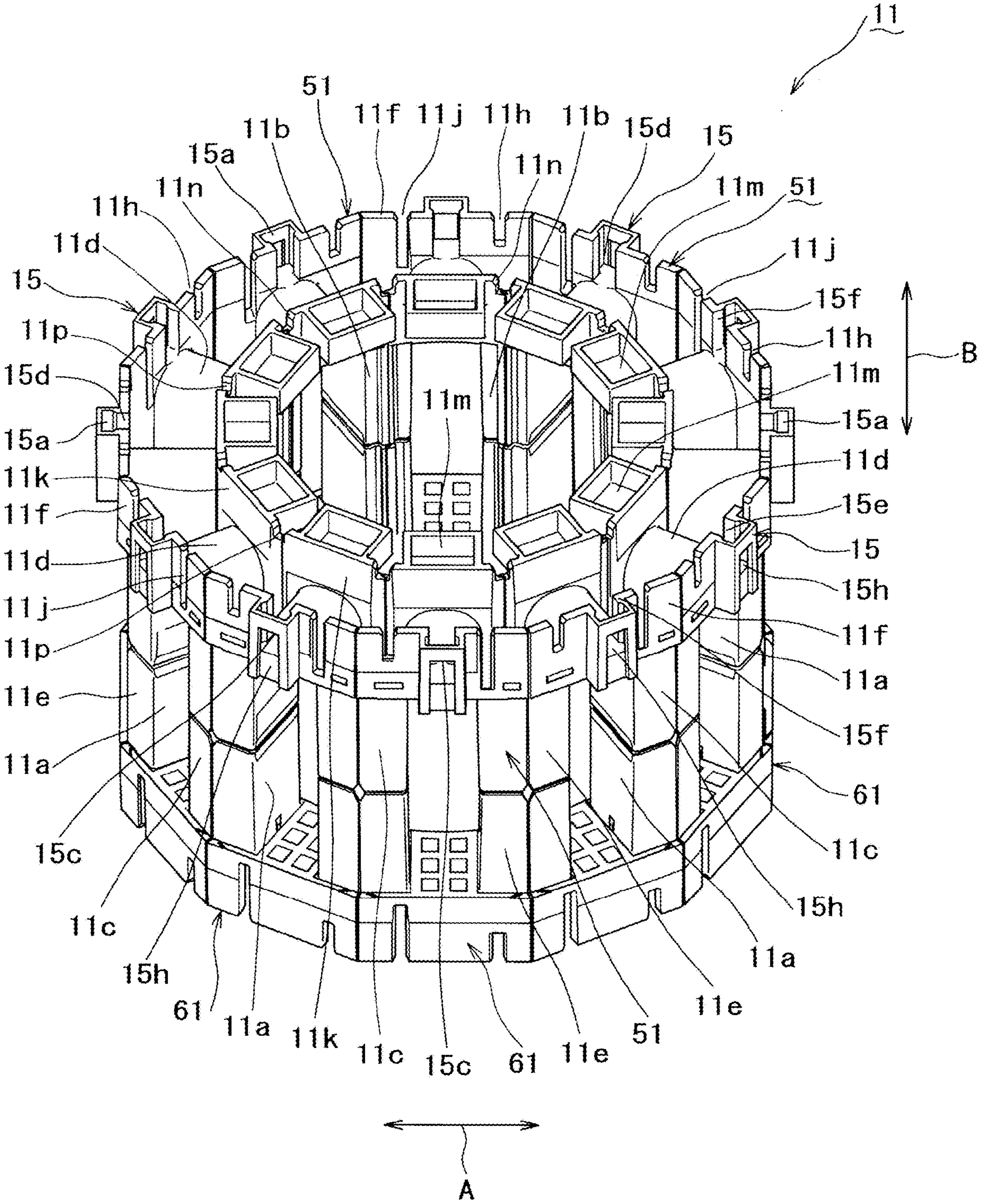
FIG. 7 is a perspective view showing an insulator of the motor.
Figure 8:
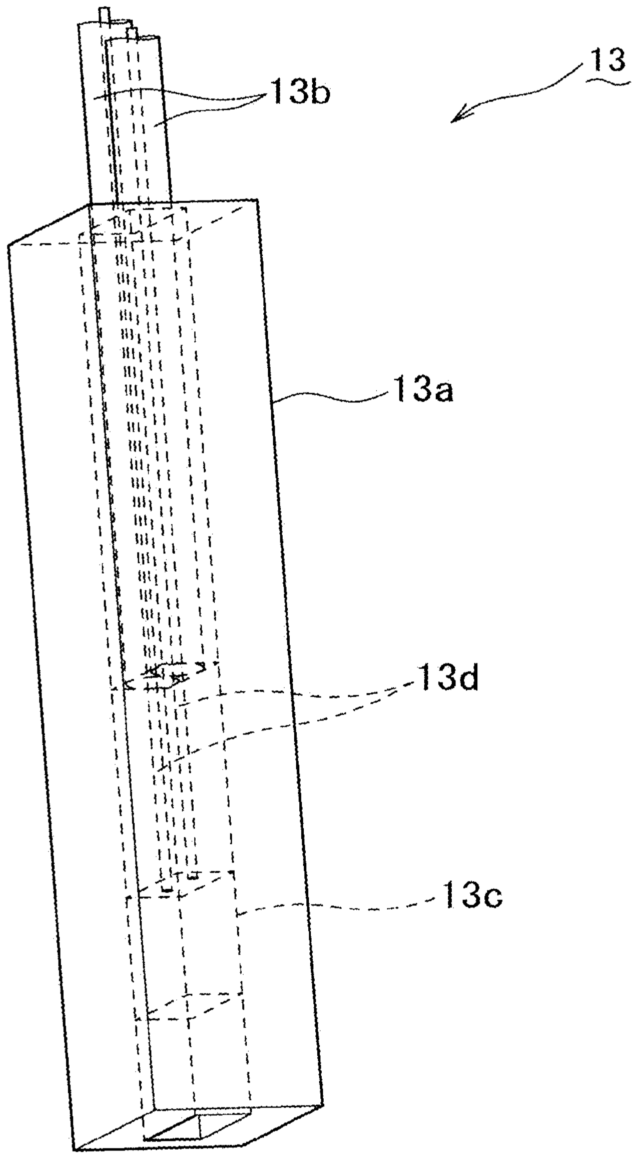
FIG. 8 is a perspective view showing a thermistor of the motor.

Hereinafter, one embodiment of the present invention will be described with reference to the drawings. FIG. 1 is a side view showing a motor according to an embodiment of the present invention. FIG. 2 is a cross-sectional view of the motor with a portion cut away in the axial direction. FIG. 3 is a partial perspective view of the motor. FIG. 4 is a partial radial cross-sectional view of the motor. FIG. 5 is a partial axial cross-sectional view of the motor. FIG. 6 is a side view of the motor with a portion cut away. FIG. 7 is a perspective view showing an insulator of the motor. FIG. 8 is a perspective view showing a thermistor of the motor. (A) and (B) of FIG. 9 are views showing a leaf spring material of the motor, wherein (A) is a perspective view from the outside and (B) is a perspective view from the inside. FIG. 10 is a perspective view showing a bus bar unit of the motor from the rear side. FIG. 11 is a perspective view showing the bus bar unit from the front side. FIG. 12 is a schematic view showing a state where the motor is attached to a side-mounted electric motorcycle. FIG. 13 is a schematic view showing a state where the motor is attached to a center-mounted electric motorcycle. FIG. 14 is a process diagram showing manufacturing steps of the motor.

<Overall Configuration>

The motor 1 according to this embodiment is a three-phase motor called a brushless motor. The motor 1 is used, for example, as a drive motor for an electric motorcycle that is driven frequently and requires high durability. For example, the motor 1 is used as a drive motor for a side-mounted electric motorcycle that is driven beside the drive wheel as shown in FIG. 12, or a center-mounted electric motorcycle that is driven between the front wheel and the rear wheel as shown in FIG. 13.

Also, the motor 1 is an IPM motor (Interior Permanent Magnet Motor) in which a magnet (permanent magnet) is embedded in a rotor 2. Specifically, as shown in FIG. 2, the motor 1 includes a substantially cylindrical stator 3, and has an inner rotor type configuration in which the rotor 2 is concentrically and rotatably attached inside the stator 3. The rotor 2 is supported rotatably around a rotation shaft 2*a*. In the following description, unless otherwise specified, the circumferential direction, the axial direction, and the radial direction are defined based on the axis of the rotation shaft 2*a*.

A front bracket 4 and a rear bracket 5 serving as lids are attached to both axial ends of the stator 3, and a case body 6 serving as a housing is attached between the front bracket 4 and the rear bracket 5. The front bracket 4 is provided with an insertion hole 4*a* as an opening through which one end of the rotation shaft 2*a* of the rotor 2 is inserted and protrudes. In the following description, the side on which the front bracket 4 is located is defined as the front side, and the side on which the rear bracket 5 is located is defined as the rear side.

The case body 6 is formed in a substantially cylindrical shape with openings on both the front side and the rear side. As shown in FIG. 1 and FIG. 2, the motor 1 has a three-part structure composed of the front bracket 4, the rear bracket 5, and the case body 6. Then, in the motor 1, the stator 3 is installed and fixed inside the case body 6, and one end of the rotation shaft 2*a* protrudes from the insertion hole 4*a* of the front bracket 4 so that the rotation shaft 2*a* is fixed between the front bracket 4 and the rear bracket 5, and the rotor 2 is rotatable within the stator 3. An annular bus bar unit 7 is concentrically attached to the end portion on the rear side of the stator 3. A substantially rectangular flat plate-shaped rotation sensor board 8, to which a conductive wire (not shown) connected to a rotation sensor that detects the rotation speed of the rotor 2, for example, is connected, is attached to the rear side of the bus bar unit 7. The rotation sensor board 8 is attached at a position eccentric from the rotation center of the rotation shaft 2*a*. In addition, as shown in FIG. 5 and FIG. 6, an output connector 9A is attached to the outer peripheral portion of the case body 6 for drawing out each conductive wire connected to a connector 8*a* of the rotation sensor board 8. Furthermore, a terminal holder 9B is attached to the outer peripheral portion of the case body 6 to be adjacent to the output connector 9A. The terminal holder 9B is electrically connected to a predetermined bus bar terminal 7*k* of the bus bar unit 7 via a terminal 9D.

The stator 3 includes a stator core 3*a* formed by laminating a plurality of electromagnetic steel plates. The stator core 3*a* is press-fitted into the case body 6. Further, the front bracket 4 is fixed to the front side of the case body 6 by bolts 10*a*, and the rear bracket 5 is fixed to the rear side of the case body 6 by bolts 10*b*. The front bracket 4 and the rear bracket 5 are fixed to the case body 6 by separate bolts 10*a* and 10*b*. The stator core 3*a* includes a cylindrical stator core main body 3*b* and a plurality of teeth 3*c* protruding radially inward from the inner peripheral side of the stator core main body 3*b*. The teeth 3*c* are provided, for example, in a number of 12, and are provided at equal intervals in the circumferential direction. An insulator 11 is attached to each tooth 3*c*, and a winding coil 12 is wound around each tooth 3*c* via the insulator 11. The stator 3 is divided into 12 parts in the circumferential direction, and a part of the 12-part stator is configured as a stator member 31. The stator members 31 are formed in the same shape, each of which has one of the 12 divided parts of the stator core main body 3*b* and the tooth 3*c*. Further, concave and convex surfaces 31*a* that fit to each other are formed on the circumferential end surfaces of the portions of the stator members 31 that correspond to the stator core main body 3*b*. The stator 3 has a configuration that includes the insulator 11 and a total of 12 winding coils 12.

The insulator 11 is constituted by two parts made of insulating synthetic resin, and is mounted on the tooth 3*c* from both axial end sides of the motor 1, respectively. Further, the insulator 11 is formed to have an outer diameter smaller than the outer diameter of the stator 3. Specifically, the insulator 11 includes, for example, 24 insulator main bodies 11*a*, each of which has an inner periphery that is perforated in a rectangular shape and an outer periphery that is formed in an elliptical shape so as to cover the outer peripheral surface of the tooth 3*c*. The insulator 11 has a total of 24 insulator main bodies 11*a* arranged at equal intervals in the circumferential direction with the axial direction of the insulator main bodies 11*a* directed in the radial direction of the motor 1. Then, the insulator 11 is attached with the stator core main body 3*b* protruding from the outer peripheral side of each insulator main body 11.

An inner flange 11*b* is provided around the entire periphery at the peripheral edge of each insulator main body 11*a* on the stator core main body 3*b* side. Further, an outer flange 11*c* is provided around the entire periphery at the peripheral edge on the tip side of the tooth 3*c*, opposite to the inner flange 11*b* of the insulator main body 11*a*. Then, the insulator main body 11*a*, the inner flange 11*b*, and the outer flange 11*c* form a winding portion 11*d* for mounting the winding coil 12 thereon. The winding coil 12 is attached to each winding portion 11*d*, and is formed by winding a wire 12*a* from the inner peripheral side to the outer peripheral side multiple times. The winding coil 12 is attached to the winding portion 11*d* by winding the wire 12*a* with the radial direction as the central axis direction. As shown in FIG. 7, the winding portions 11*d* are spaced and arranged at equal intervals in the circumferential direction.

The wire 12*a* is a conductive rectangular wire having a rectangular cross section, and the surface is covered with an insulating material. The wire 12*a* is wound by bringing one side surface of the wire 12*a* into contact with the winding portion 11*d*, and then further laminated and wound while bringing one side surface of the wire 12*a* into contact with the other side surface of the wound wire 12*a*. Furthermore, the wire 12*a* is wound to be adjacent to and in contact with the already wound wire 12*a* while alternately changing the winding direction from the outer peripheral side to the inner peripheral side of the winding portion 11*d* and then from the inner peripheral side to the outer peripheral side. Then, the wire 12*a* is ultimately arranged to be adjacent in the radial direction and wound and aligned from the inner peripheral side to the outer peripheral side or from the outer peripheral side to the inner peripheral side of the winding portion 11*d* to form the winding coil 12.

The outer flange 11*c* of the insulator 11 has two side portions that come into contact with the stator core main body 3*b* of the stator core 3*a* and serve as flat plate-shaped stator core receiving portions 11*e*. Further, the outer flange 11*c* has an axial end portion that does not come into contact with the stator core main body 3*b* and serves as a flat plate-shaped outer wall portion 11*f*. The outer wall portion 11*f* is formed to be thicker than the stator core receiving portion 11*e*, and the outer surface of the outer wall portion 11*f* is formed in a flange shape that protrudes outward from the outer surface of the stator core receiving portion 11*e*. As a result, a step portion 11*g* is formed between the outer wall portion 11*f* and the stator core receiving portion 11, and the stator core main body 3*b* is fitted between the step portions 11*g* of the outer wall portions 11*f* located at both ends in the axial direction.

Each outer wall portion 11*f* of the insulator 11 has a width direction A respectively perpendicular to the axial direction and the radial direction, and is arranged in the circumferential direction to form a dodecagonal shape as viewed in the axial direction. A pair of winding fitting grooves 11*h* and 11*j* are provided at a predetermined distance from each other on the end surface on the rear side or the front side of each outer wall portion 11*f*. These winding fitting grooves 11*h* and 11*j* are formed in a concave groove shape that opens on the end surface side of the outer wall portion 11*f* and penetrates the outer wall portion 11*f* in the thickness direction. Then, one winding fitting groove 11*h* is shallower in the axial direction than the other winding fitting groove 11*j*, that is, formed in a small cutout shape.

When starting to wind the wire 12*a* around the winding portion 11*d*, a start point portion 12*c* on the base side of the wire 12*a* is fitted into one winding fitting groove 11*h* and temporarily fixed therein. An end point portion 12*b* protruding from the outer peripheral side of the wire 12*a* in a state where the winding coil 12 is formed by winding the wire 12*a* around the winding portion 11*d* is fitted into the other winding fitting groove 11*j* and temporarily fixed therein. That is, the winding coil 12 is configured by gradually winding the wire 12*a* onto the winding portion 11*d* from the inner layer side in a state where the start point portion 12*c* of the wire 12*a* is temporarily fixed in the winding fitting groove 11*h*, and then temporarily fixing the end point portion 12*b* of the wire 12*a* in the winding fitting groove 11*j* to draw out and guide the wire 12*a* to the outer peripheral side of the insulator 11.

Furthermore, as shown in FIG. 7, the insulator 11 is configured to be divided into two parts in the axial direction, the rear side one-half portion of the two parts is divided into 12 parts in the circumferential direction, and a part of the 12-part insulator 11 is configured as a rear side insulator member 51. The rear side insulator members 51 are formed in the same shape, each of which has the rear side half of the insulator main body 11*a*, the inner flange 11*b*, and the outer flange 11*c*. Furthermore, the front side one-half portion of the insulator 11, which is divided into two in the axial direction, is also divided into 12 parts in the circumferential direction, and a part of the 12-part insulator 11 is configured as a front side insulator member 61. The front side insulator members 61 are also formed in the same shape, each of which has the front side half of the insulator main body 11, the inner flange 11*b*, and the outer flange 11*c*.

<Fixing Configuration of the Insulator 11>

An inner wall portion 11*k* is formed at the axial end portion of the inner flange 11*b* of each rear side insulator member 51 that faces the sensor attachment portion 15. The inner wall portion 11*k* is formed to be thicker than the stator core receiving portion 11*e*, and the inner surface of the inner wall portion 11*k* is formed in a flange shape that protrudes inward from the inner surface of the stator core receiving portion 11*e*. Then, an insertion receiving portion 11*m* that protrudes in the radially inner direction is provided on the inside of the inner wall portion 11*k*. As shown in FIG. 3, FIG. 4, and FIG. 7, the insertion receiving portion 11*m* is formed in a tray shape having a concave cross section and an opening on the rear side. The insertion receiving portion 11*m* is provided on each rear side insulator member 51, and a total of 12 insertion receiving portions 11*m* are arranged at equal intervals in the circumferential direction of the insulator 11. Furthermore, each insertion receiving portion 11*m* is provided to protrude in the radially inner direction to a position covering a part of the rotor 2, that is, the outer peripheral edge of the rotor 2, in a state where the rotor 2 is attached to the stator 3.

In addition, both end portions of the inner wall portion 11*k* of each rear side insulator member 51 in the width direction A are cut out to form fitting step portions 11*n*. The fitting step portions 11*n* are provided at the corners on the rear side of the inner wall portion 11*k*, and in a state where a total of 12 rear side insulator members 51 are assembled, the adjacent fitting step portions 11*n* form a concave fitting groove 11*p*. In short, the fitting groove 11*p* is located between the insertion receiving portions 11*m* of the insulator 11, and a total of 12 fitting grooves 11*p* are arranged at equal intervals in the circumferential direction on the rear side of the insulator 11.

The bus bar unit 7 is concentrically fixed to the rear side of the insulator 11. The bus bar unit 7 supplies power to each winding coil 12, and includes a substantially annular bus bar unit main body 7*a*, as shown in FIG. 4, FIG. 10, and FIG. 11. An insertion fixing portion 7*b* serving as an insulator fixing portion to be inserted into the insertion receiving portion 11*m* of the insulator 11 is provided at a position on the inner peripheral side of the bus bar unit main body 7*a* near the front side. The bus bar unit main body 7*a* is formed to be thicker than the insertion fixing portion 7*b* in the axial direction. The insertion fixing portion 7*b* is formed in a protruding rectangular column shape that protrudes to the front side and is inserted into the insertion receiving portion 11*m* from the rear side. A total of 12 insertion fixing portions 7*b* are arranged at equal intervals in the circumferential direction. Furthermore, in a state where the rotor 2 is disposed on the outer periphery of the stator 3, each insertion fixing portion 7*b* is provided to protrude in the radially inner direction to a position covering a part of the rotor 2, that is, the outer peripheral edge of the rotor 2.

As shown in FIG. 11, a total of 12 locking protrusions 7*c* are provided on the bottom surface portion located on the front side of the bus bar unit main body 7*a*. The locking protrusions 7*c* are configured to fit into the fitting grooves 11*p* of the insulator 11 when the bus bar unit 7 is concentrically fixed to the rear side of the insulator 11. The bus bar unit 7 is formed with a predetermined clearance so that the bottom surface on the front side of the bus bar unit 7 does not contact the surface on the rear side of the winding coil 12. The locking protrusion 7*c* facilitates the alignment of the bus bar unit 7 with respect to the insulator 11 in the circumferential direction, and fixes the position by restricting the rotational movement of the bus bar unit 7 with respect to the insulator 11.

Furthermore, the bus bar unit 7 is configured so that, as shown in FIG. 4, a predetermined gap C serving as an adhesive point is formed between the bottom surface on the front side of the insertion fixing portion 7*b* of the bus bar unit 7 and the bottom surface of the insertion receiving portion 11*m* of the insulator 11 in a state where the bus bar unit 7 is positioned and fixed by fitting the locking protrusions 7*c* of the bus bar unit 7 into the fitting grooves 11*p* of the insulator 11 and inserting the insertion fixing portions 7*b* of the bus bar unit 7 into the insertion receiving portions 11*m* of the insulator 11.

Also, a leg portion 7*e* having a through hole 7*d* penetrating into each insertion fixing portion 7*b* is provided on the rear side of each insertion fixing portion 7*b* of the bus bar unit main body 7*a*. The leg portion 7*e* protrudes further toward the inner peripheral side of the bus bar unit main body 7*a* than the insertion fixing portion 7*b*. The through hole 7*d* penetrates from the rear side of the leg portion 7*e* to the front side of the insertion fixing portion 7*b*, and is formed in a conical shape, that is, a funnel shape with a decreasing diameter in the insertion direction D in which the insertion receiving portion 11*m* of the insulator 11 is inserted into the insertion fixing portion 7*b*. Further, the through hole 7*d* has a length that is the sum of the thickness of the leg portion 7*e* and the thickness of the insertion fixing portion 7*b*, and the internal volume of the through hole 7*d* is designed to be larger than the amount of an adhesive 7*f* filled into the through hole 7*d*. Then, as shown in FIG. 4, the through hole 7*d* functions as an adhesive filling port for filling the adhesive 7*f* having fluidity from the rear side into the gap C between the insertion fixing portion 7*b* and the insertion receiving portion 11*m*, immersing the side surface of the insertion fixing portion 7*b* in the adhesive 7*f*, and adhesively fixing the insertion fixing portion 7*b* and the insertion receiving portion 11*m*.

In addition, the leg portions 7*e* are connected in the circumferential direction by flat plate-shaped inner flange portions 7*g* and protrude further toward the rear side than the inner flange portions 7*g*. Each inner flange portion 7*g* forms a step portion 7*h* with the inner peripheral surface of the bus bar unit main body 7*a*. Then, a concave step portion 7*j*, which is formed by recessing the inner peripheral surface of the bus bar unit main body 7*a* into a concave shape, is formed in a portion of the step portion 7*h* on the outer peripheral side of the leg portion 7*e*.

A flange-shaped bus bar terminal 7*k* serving as a coil connection portion for positioning and fixing the start point portion 12*c* and the end point portion 12*b* of each winding coil 12 is provided on the outer peripheral portion of the bus bar unit main body 7*a*. Each bus bar terminal 7*k* protrudes to the outer peripheral side along the radial direction, and the same as the number of the winding coils 12, a total of 12 bus bar terminals 7*k* are provided and arranged at equal intervals in the circumferential direction. A pair of connection portions 7*m* are provided on the outer peripheral edge of each bus bar terminal 7*k*, to which the start point portion 12*c* or the end point portion 12*b* of the winding coil 12 is welded and electrically connected.

<Temperature Detection Configuration>

A thermistor 13 for detecting the temperature of the winding coil 12 and a leaf spring material 14 for urging the thermistor 13 against the winding coil 12 are attached to the outer periphery of the insulator 11. The thermistor 13 and the leaf spring material 14 are attached to a thermistor housing portion 15 provided on the outside of the outer wall portion 11*f* located on the rear side of the insulator 11. In short, the thermistor housing portion 15 is provided in each of the rear side insulator members 51. Then, the thermistor housing portion 15 is provided between a pair of winding fitting grooves 11*h* and 11*j* located on the outside of the outer wall portion 11*f* at the center position in the width direction of the outer surface of the outer wall portion 11*f*. That is, the thermistor housing portion 15 is located between the start point portion 12*c* and the end point portion 12*b* of the winding coil 12.

Furthermore, the thermistor housing portion 15 has a mounting recess 15*a* into which the thermistor 13 is fitted from the rear side. The mounting recess 15*a* is provided along the axial direction and is formed in a box shape protruding toward the outer peripheral side of the insulator 11, that is, the outside of the outer wall portion 11*f*. Further, the mounting recess 15*a* is provided from the end portion on the rear side of the outer wall portion 11*f* to a position along the outer peripheral surface of the winding portion 11*d*. In addition, as shown in FIG. 3 and FIG. 4, the mounting recess 15*a* has a function of preventing the insulator 11 from falling over by bringing the bottom portion on the front side of the mounting recess 15*a* into contact with the surface on the rear side of the stator core main body 3*b*.

A locking groove 15*b* penetrating the mounting recess 15*a* is provided on the outer surface of the mounting recess 15*a*. The locking groove 15*b* is formed in a rectangular shape, and the opening edge on the rear side forms a locking surface 15*c* that is perpendicular to the outer wall portion 11*f*. Further, a housing recess 15*d* having a concave cross section is provided on the insulator main body 11*a* side of the outer surface of the mounting recess 15*a*. The housing recess 15*d* is provided continuously on the insulator main body 11*a* side of the locking groove 15*b*. In addition, the housing recess 15*d* is provided from the opening edge located opposite to the locking surface 15*c* of the housing recess 15*d* to an end portion on the rear side in the height direction perpendicular to the width direction A.

The thermistor housing portion 15 is also formed with an opening 15*e* for bringing the thermistor 13 attached to the mounting recess 15*a* into direct contact with the winding coil 12. The opening 15*e* penetrates to the rear side and is formed with a width slightly smaller than the width of the mounting recess 15*a*. In addition, the opening 15*e* has a shape formed by cutting the portion from the end portion on the rear side of the outer wall portion 11*f* to the outer peripheral surface of the winding portion 11*d* into a concave shape. The opening 15*e* is provided at the center position in the width direction A along the axial direction. Therefore, the opening 15*e* is provided at the center position in the width direction A of the winding coil 12 wound around the winding portion 11*d* along the lamination direction B, which is the winding direction of the wire 12*a* of the winding coil 12. As a result, the thermistor 13 is attached to the thermistor housing portion 15 to extend from the opening 15*e* along the lamination direction B of the winding coil 12 and come into contact with the plurality of wires 12*a* located in the inner layer of the winding coil 12.

Then, locking pieces 15*f* which are protruding inner pieces of the mounting recess 15*a* are provided at both sides of the opening 15*e* in the width direction A. The locking pieces 15*f* are located near both sides of the thermistor 13 attached to the mounting recess 15*a*, and restrict the movement of the thermistor 13 in the width direction A.

As shown in FIG. 8, the thermistor 13 includes a thermistor main body 13*a* having an elongated rectangular cross section. The thermistor 13 has a configuration in which a pair of conductive wires 13*b* are led out from one end side in the longitudinal direction of the thermistor main body 13*a*. Then, a detection element 13*c* that serves as a base point for detecting temperature is housed inside the thermistor main body 13*a*. The detection element 13*c* is attached at a position on one end side spaced a predetermined distance from the other end surface of the thermistor main body 13*a*. Besides, a pair of lead wires 13*d* are connected to one end side of the detection element 13*c* in the longitudinal direction of the thermistor main body 13*a*. Then, the end portions of the pair of lead wires 13*d* are electrically connected to the pair of conductive wires 13*b*.

The leaf spring material 14 is an urging member that urges the thermistor 13 against the winding coil 12. As shown in (A) and (B) of FIG. 9, the leaf spring material 14 includes a thin, long, flat plate-shaped leaf spring body 14*a*. The leaf spring body 14*a* has one end side bent into an L shape and the other end side bent into a V shape in the same direction as the one end side, and is configured to have an elastic force for urging the thermistor 13 against the winding coil 12. An L-shaped bent portion 14*b* on one end side of the leaf spring body 14*a* is provided with a concave insertion recess 14*c* for inserting the conductive wire 13*b* protruding from the thermistor 13. The bent portion 14*b* is configured to insert the conductive wire 13*b* of the thermistor 13 into the insertion recess 14*c* and hold the base end side of the thermistor main body 13*a* of the thermistor 13 attached to the thermistor housing portion 15.

On the other hand, a U-shaped elastic piece 14*d* on the other end side of the leaf spring 14*a* is inserted into the mounting recess 15*a* of the thermistor housing portion 15 together with the thermistor 13, and locks the thermistor 13. The elastic piece 14*d* is configured to urge the thermistor 13 attached to the thermistor housing portion 15 toward the winding coil 12 side by the elastic force of the elastic piece 14*d*. Furthermore, a retaining piece 14*e* is provided in the intermediate portion in the longitudinal direction of the leaf spring body 14*a* to protrude opposite to the bending direction of the bent portion 14*b*. The retaining piece 14*e* is formed by cutting a part of the leaf spring body 14*a*. Then, the retaining piece 14*e* has a so-called snap-fit configuration that is locked to the locking surface 15*c* of the thermistor housing portion 15 to retain the thermistor 13 from coming out of the thermistor housing portion 15 when the leaf spring material 14 is fitted together with the thermistor 13 into the mounting recess 15*a* of the thermistor housing portion 15.

Furthermore, as shown in FIG. 2, one thermistor 13 and one leaf spring material 14 are attached to only one thermistor housing portion 15 of the multiple rear side insulator members 51 of the insulator 11. The thermistor 13 is configured to detect the temperature of one adjacent winding coil 12 among the plurality of winding coils 12. Here, one output side of the conductive wire 13*b* of the thermistor 13 is routed to the output connector 9A and led out to the outside, as shown in FIG. 5. Further, the other ground side of the conductive wire 13*b* is electrically connected to the rotation sensor board 8 via the connector 8*a*. Therefore, from the viewpoint of shortening the length of the conductive wire 13*b* and considering the routing of the conductive wire 13*b*, the thermistor 13 is attached to the thermistor housing portion 15 adjacent to each of the connector 8*a* of the rotation sensor board 8 and the output connector 9A.

In addition, the thermistor 13 is press-fitted together with the leaf spring material 14 into the thermistor housing portion 15 and stored therein. Then, the thermistor 13 is pressed toward the winding coil 12 side by the elastic force of the leaf spring material 14 generated between the thermistor 13 and the outer peripheral surface of the thermistor housing portion 15, and the thermistor 13 comes into contact with the wire 12*a* located on the inner peripheral side of the winding coil 12 from the opening 15*e* of the thermistor housing portion 15. Furthermore, the thermistor 13 is fixed in contact with the plurality of wires 12*a* located on the inner layer side of the winding coil 12.

<Manufacturing Method>

Next, manufacturing steps of a manufacturing method for the motor 1 according to the above embodiment will be described with reference to FIG. 14.

(Insulator Assembling Step)

First, the insulator 11 is attached to the stator core 3*a*. At this time, the rear side insulator member 51 and the front side insulator member 61 are combined to form one winding portion 11*d* (S1).

(Winding Step)

In this state, the winding coil 12 is mounted by winding the wire 12*a* around the winding portion 11*d* (S2).

(Stator Assembling Step)

Next, a total of 12 units are prepared by combining the rear side insulator member 51 and the front side insulator member 61, mounting the winding coil 12, and fitting the stator member 31 thereto. Then, these 12 units are arranged in an arc shape with the respective outer wall portion 11*f* sides facing the outer peripheral side. At this time, the opposing concave and convex surfaces 31*a* of adjacent stator members 31 are fitted together to form the arc-shaped stator 3 (S3).

(Bus Bar Unit Assembling Step)

Thereafter, the bus bar unit 7 is assembled to the rear side of the insulator 11 (S4). At this time, the respective insertion fixing portions 7*b* of the bus bar unit 7 are inserted into the respective insertion receiving portions 11*m* of the insulator 11, and the respective locking protrusions 7*c* of the bus bar unit 7 are fitted into the respective fitting grooves 11*p* of the insulator 11.

(Bus Bar Fixing Step)

Next, the start point portion 12*c* and the end point portion 12*b* of each winding coil 12 attached to the insulator 11 are fixed by welding to the connection portion 7*m* of each bus bar terminal 7*k* of the bus bar unit 7, and the start point portion 12*c* and the end point portion 12*b* of each winding coil 12 are electrically connected to the predetermined bus bar terminal 7*k* (S5).

(Bonding Step)

In this state, a predetermined amount of adhesive 7*f* is injected into each through hole 7*d* of the bus bar unit 7, the adhesive 7*f* is filled into the gap C formed between the insertion fixing portion 7*b* of the bus bar unit 7 and the insertion receiving portion 11*m* of the insulator 11 and hardened, and the insertion fixing portion 7*b* of the bus bar unit 7 and the insertion receiving portion 11*m* of the insulator 11 are bonded and fixed by the adhesive 7*f*(S6).

(Board Attaching Step)

Thereafter, the rotation sensor board 8 is attached to the bus bar unit 7 (S7).

(Thermistor Attaching Step)

Next, the base end portion of the conductive wire 13*b* of the thermistor 13 is inserted into the insertion recess 14*c* of the leaf spring material 14. Then, the leaf spring body 14*a* of the leaf spring material 14 is placed adjacent to the outside of the thermistor main body 13*a* of the thermistor 13. In this state, starting with the elastic piece 14*d* side of the leaf spring material 14, the thermistor 13 and the leaf spring material 14 are press-fitted into the mounting recess 15*a* of the thermistor housing portion 15 located adjacent to the rotation sensor board 8. At this time, the retaining pieces 14*e* of the leaf spring material 14 engages with the locking surfaces 15*c* of the thermistor housing portion 15, so that the thermistor 13 is held in the thermistor housing portion 15 and prevented from coming out (S8).

In the thermistor housing portion 15, the elastic piece 14*d* of the leaf spring material 14 is pressed between the outer surface of the mounting recess 15*a* and the thermistor 13, and is elastically deformed. Then, the elastic force of the elastic piece 14*d* presses the thermistor 13 toward the winding coil 12 side, which brings the thermistor 13 into direct contact with the plurality of wires 12*a* located on the inner peripheral side of the winding coil 12 through the opening 15*e* of the thermistor housing portion 15.

(Conductive Wire Connecting Step)

Then, one output side of the conductive wire 13*b* of the thermistor 13 is routed to the output connector 9A and led out to the outside, and the other ground side of the conductive wire 13*b* is electrically connected to the rotation sensor board 8 via the connector 8*a* (S9).

(Case Body Assembling Step)

Thereafter, the stator 3 and the insulator 11 are attached to the case body 6 (S10).

(Front Bracket Attaching Step)

Next, the front bracket 4 is attached to the front side of the case body 6, and the front bracket 4 is fixed to the case body 6 with the bolts 10*a* (S11).

(Rotor Assembling Step)

Furthermore, the rotor 2 is inserted into the stator 3 from the rear side (S12).

(Rear Bracket Attaching Step)

Thereafter, the rear bracket 5 is attached to the rear side of the stator 3, and then the rear bracket 5 is fixed to the case body 6 with the bolts 10*b* (S13).

EFFECT

As described above, the motor 1 according to the above embodiment has a configuration in which the bus bar unit 7 is concentrically fixed to the rear side of the insulator 11. Therefore, the bus bar unit 7 can be firmly fixed to the insulator 11, so vibration that may occur when the motor 1 is driven can be appropriately suppressed.

In particular, a plurality of insertion receiving portions 11*m* are provided on the inner peripheral side of the insulator 11 and a plurality of insertion fixing portions 7*b* are provided on the inner peripheral side of the bus bar unit 7, and these insertion fixing portions 7*b* are inserted into the insertion receiving portions 11*m* and then fixed with the adhesive 7*f*. Since the stress applied to the connection portion 7*m* between the bus bar terminal 7*k* and the start point portion 12*c* and the end point portion 12*b* of the winding coil 12 can be reduced, it is possible to prevent the connection portion 7*m* from breaking due to stress when the bus bar unit 7 is fixed to the insulator 11.

Further, the configuration is provided with the insertion receiving portion 11*m* protruding in the radially inner direction of the insulator 11 and the insertion fixing portion 7*b* protruding in the radially inner direction of the bus bar unit 7. Therefore, even if the start point portion 12*c*, which is the winding start portion of the winding coil 12, and the end point portion 12*b*, which is the lead-out portion, are respectively protruded toward the radially outer side of the insulator 11, or the shape of the winding 12 as viewed in the axial direction is substantially sector-shaped in order to improve the space factor of the winding coil 12, the connection portion 7*m* between the bus bar terminal 7*k* and the start point portion 12*c* and the end point portion 12*b* of the winding coil 12 can be disposed without interfering with the insertion receiving portion 11*m* of the insulator 11 and the insertion fixing portion 7*b* of the bus bar unit 7 in terms of layout.

Moreover, the through hole 7*d* is provided in the insertion fixing portion 7*b* of the bus bar unit 7, and the adhesive 7*f* flows in from the through hole 7*d* to adhesively fix the insertion fixing portion 7*b* of the bus bar unit 7 to the insertion receiving portion 11*m* of the insulator 11. Therefore, after assembling the bus bar unit 7 to the insulator 11 and then welding and fixing the start point portion 12*c* and the end point portion 12*b* of each winding coil 12 to the connection portion 7*m* of each bus bar terminal 7*k* of the bus bar unit 7, the bus bar unit 7 can be fixed to the insulator 11 by applying the adhesive 7*f* to the through hole 7*d*. As a result, for example, compared to a case where the adhesive 7*f* is applied and then, before the adhesive 7*f* hardens, the start point portion 12*c* and the end point portion 12*b* of the winding coil 12 are crimped and welded after the bus bar unit 7 is assembled to the insulator 11, it is easier to predict and control the behavior of the fluid adhesive 7*f*, making it easier to prevent problems such as insufficient adhesive area. Furthermore, compared to a case where the bus bar unit 7 is fixed to the insulator 11 by screws or the like, it is possible to reduce the number of steps for assembling the bus bar unit 7, thereby reducing the costs of the motor 1.

Further, the insertion receiving portion 11*m* of the insulator 11 and the insertion fixing portion 7*b* of the bus bar unit 7 are respectively protruded toward the radially inner side to a position covering a part of the rotor 2. In short, the insertion receiving portion 11*m* and the insertion fixing portion 7*b* are arranged to overlap the rotor 2 when viewed in the axial direction. As a result, the insertion fixing portion 7*b* is inserted into the insertion receiving portion 11*m* and fixed, so the fixing structure of the insertion receiving portion 11*m* and the insertion fixing portion 7*b* can be ensured to be larger in the radial direction. Thus, the bus bar unit 7 can be fixed to the insulator 11 more firmly.

Also, since the insertion receiving portion 11*m* and the insertion fixing portion 7*b* are respectively protruded toward the radially inner side to a position covering a part of the rotor 2, the rotor 2 cannot be assembled from the rear side of the stator 3. Thus, in order to allow the rotor 2 to be assembled from the front side of the stator 3, the motor 1 has a three-part structure composed of the front bracket 4, the rear bracket 5, and the case body 6. As a result, by appropriately changing the structure of the front bracket 4 to fit the object to which the motor 1 is than the front bracket 4. Therefore, simply by redesigning the front bracket 4, the motor 1 can be adapted to be even a drive motor for a side-mounted electric motorcycle as shown in FIG. 12 or a center-mounted electric motorcycle as shown in FIG. 13, for example, which can greatly improve the versatility of the motor 1.

Furthermore, a plurality of the insertion receiving portions 11*m* and a plurality of the insertion fixing portions 7*b* are arranged at equal intervals in the circumferential direction of the insulator 11 and the bus bar unit 7, respectively. Therefore, the bus bar unit 7 can be fixed to the insulator 11 at a plurality of points along the circumferential direction on the inner peripheral side by the insertion receiving portions 11*m* and the insertion fixing portions 7*b*, so the bus bar unit 7 can be firmly fixed to the insulator 11 in the circumferential direction. Further, the insertion receiving portion 11*m* of the insulator 11 is formed in a concave shape, and the insertion fixing portion 7*b* of the bus bar unit 7 is inserted into the insertion receiving portion 11*m*. Therefore, the configuration for fixing the bus bar unit 7 to the insulator 11 can be simplified, and the work of assembling the bus bar unit 7 to the insulator 11 can be simplified. Thus, the assemblability of the bus bar unit 7 can be improved.

In addition, by forming the through hole 7*d* of the bus bar unit 7 in a funnel shape with a decreasing diameter in the insertion direction D, it is possible to improve the demoldability in the case of manufacturing the synthetic resin bus bar unit 7 by injection molding or the like. Then, since the portion of the through hole 7*d* on the inlet side where the adhesive 7*f* is applied is widened, the bus bar unit 7 can be appropriately fixed to the insulator 11 by a dispenser that applies the adhesive 7*f*.

Furthermore, by making the axial thickness of the bus bar unit main body 7*a* of the bus bar unit 7 larger than that of the insertion fixing portion 7*b*, the upper leg portion 7*e* of the insertion fixing portion 7*b* can protrude upward, so it is possible to secure the internal volume of the through hole 7*d*. Then, by setting the internal volume of the through hole 7*d* to be larger than the amount of the adhesive 7*f* to be applied, it is possible to prevent the adhesive 7*f* from overflowing out of the through hole 7*d*.

In addition, by providing the flat plate-shaped inner flange portion 7*g* in the bus bar unit 7, it is possible to prevent the adhesive 7*f* injected from the through hole 7*d* from dripping to the inside of the motor 1, such as the rotor 2. Then, by connecting the leg portions 7*e* of the bus bar unit 7 in the circumferential direction with the inner flange portions 7*g*, the rigidity of the bus bar unit can be improved, and durability against vibration and impact can be improved. This is particularly advantageous when applied to an electric motorcycle where dealing with vibration is important.

Moreover, in the motor 1 according to the above embodiment, the thermistor housing portion 15 is provided at the center position in the width direction A on the outside of the outer wall portion 11*f* of the insulator 11, and the opening 15*e* is formed in the thermistor housing portion 15 along the lamination direction B of the winding coil 12. Then, by attaching the thermistor 13 in the thermistor housing portion 15, the thermistor 13 is located at the center position in the width direction B of the winding coil 12 and is in direct contact with the plurality of wires 12*a* on the inner layer side of the winding coil 12 in the lamination direction B.

As a result, the temperature of the wire 12*a* on the inner peripheral side in the lamination direction B of the winding coil 12, where heat is most likely to accumulate when the motor 1 is driven and which is likely to become a high-temperature area, can be detected by the thermistor 13 from outside the winding coil 12, and the temperature of the winding coil 12 can be detected with high accuracy. Thus, it is possible to appropriately suppress the occurrence of malfunctions and burnout failures due to melting of the insulator 11 and peeling of the coating of the winding coil 12, which may occur when the motor 1 reaches a high temperature, and to prevent damage to the motor 1.

In short, unlike the conventional motor in which the thermistor 13 is disposed within the winding coil 12 by winding the thermistor 13 when winding the wire 12*a* around the winding portion 11*d* of the insulator 11, and the thermistor 13 is attached to the surface of the winding coil 12, the motor 1 is configured by protruding the thermistor housing portion 15 to the outer periphery of the insulator 11. Therefore, it is no longer necessary to wind the thermistor 13 around the wire 12*a* of the winding coil 12, so the radial size of the periphery of the winding coil 12 of the motor 1 can be reduced, and the motor 1 can be made smaller in the radial direction, that is, thinner. Then, the temperature of the winding coil 12 can be accurately detected without reducing the space for winding the wire 12*a* of the insulator 11.

Also, the thermistor housing portion 15 is protruded from the outer surface of the outer wall portion 11*f* of the insulator 11, and the thermistor 13 is fitted into the thermistor housing portion 15 and fixed therein. Therefore, it is possible to reduce physical interference with the stator 3, the insulator 11, etc. that may occur when the thermistor 13 is attached and fixed in the thermistor housing portion 15. Thus, the work of assembling the thermistor 13 can be facilitated without compromising the assemblability of the stator core 3*a*. Further, the thermistor housing portion 15 is protruded toward the outside of the outer wall portion 11*f* without increasing the radial thickness of the outer wall portion 11*f* itself of the insulator 11. Therefore, the outer wall portion 11*f* of the insulator 11 can be made thin, so that deformation during molding can be suppressed even if the insulator 11 is made of synthetic resin. Thus, the insulator 11 can be molded with high precision, and the assemblability of the thermistor 13 can be improved without reducing the assemblability of the stator core 3*a*.

Furthermore, the configuration has the thermistor housing portion 15 provided on the outer peripheral side of each of the 12 winding portions 11*d* of the insulator 11. As a result, the thermistor housing portion 15 is provided for each of the 12 rear side insulator members 51 in the circumferential direction, and the rear side insulator members 15 can have the same shape. Thus, even though the insulator 11 is divided into 12 parts in the circumferential direction, the rear side insulator members 51 constituting the insulator 11 can be made common, thereby improving the manufacturability of the insulator 11.

Moreover, the thermistor housing portion 15 is provided between the winding fitting grooves 11*h* and 11*j* of the insulator 11. Therefore, the thermistor housing portion 15 can reinforce the center position in the width direction A of the outer wall portion 11*f* of the insulator 11, which tends to be a weak part, that is, the portion between the winding fitting grooves 11*h* and 11*j*. Thus, the rigidity of the outer wall portion 11*f* of the insulator 11, and therefore the rigidity of the insulator 11 itself, can be improved. Therefore, it is possible to suppress distortion of the insulator 11 that may occur in the case where stress is applied to the outer wall portion 11*f* of the insulator 11 when winding the wire 12*a* around the winding portion 11*d* of the insulator 11.

Furthermore, the wire 12*a* is a rectangular wire, and the winding coil 12 is formed by aligned winding that winds the wire 12*a* by bringing one side surface of the wire 12*a* into contact with the winding portion 11*d* and then laminates the wire 12*a* while bringing one side surface of the wire 12*a* into contact with the other side surface of the wound wire 12*a*. As a result, compared to a case where the wire 12*a* is a round wire, the thermistor 13 can be brought into contact with the multiple wires 12*a* located on the inner layer side of the winding coil 12, and the contact area between the wire 12*a* and the thermistor 13 can be increased. Thus, the temperature of the winding coil 12 can be accurately detected by the thermistor 13.

In addition, the thermistor 13 is press-fitted together with the leaf spring material 14 into the thermistor housing portion 15 of the insulator 11 and stored therein, and the elastic force of the leaf spring material 14 presses the thermistor 13 against the winding coil 12 to urge and bring the thermistor 13 into contact with the wire 12*a* on the inner layer side of the winding coil 12 through the opening 15*e* of the thermistor housing portion 15. As a result, no space is created between the thermistor 13 and the winding coil 12, and even if external impact is received or vibration occurs when the motor 1 is driven, the impact or vibration can be absorbed by the elastic force of the leaf spring material 14. Therefore, the elastic force of the leaf spring material 14 can prevent a space from being created between the thermistor 13 and the winding coil 12 and prevent the thermistor 13 from shifting. Thus, the temperature of the winding coil 12 can be detected appropriately by the thermistor 13.

Furthermore, the base end portion of the conductive wire 13*b* of the thermistor 13 is inserted into the insertion recess 14*c* of the leaf spring material 14, and when the thermistor 13 is press-fitted together with the leaf spring material 14 into the mounting recess 15*a* of the thermistor housing portion 15, a snap-fit structure is formed for the retaining piece 14*e* of the leaf spring material 14 to engage with the locking surface 15*c* of the thermistor housing portion 15. As a result, the thermistor 13 is retained and held by the leaf spring material 14 from coming out of the thermistor housing portion 15. Thus, a separate process for retaining the thermistor 13 in the thermistor housing portion 15, such as applying an adhesive or assembling a separate member, is not required. Therefore, the thermistor 13 can be easily attached to the insulator 11, and the assemblability of the thermistor 13 can be greatly improved.

In particular, the thermistor 13 is retained and held in the thermistor housing portion 15 of the insulator 11 so as not to come out, and one leaf spring material 14 is used as a member for urging and bringing the thermistor 13 fixed in the thermistor housing portion 15 into contact with the winding coil 12. Therefore, the configuration for urging the thermistor 13 toward the winding coil 12 and the configuration for retaining and holding the thermistor 13 from coming out of the thermistor housing portion 15 can be appropriately realized by using one relatively simple member, that is, the leaf spring material 14.

Based on the above, the motor 1 according to the present invention contributes to achieving the SDGs such as "Goal 9: Industry, Innovation and Infrastructure" and "Goal 12: Responsible Consumption and Production."

Nevertheless, the present invention is not limited to the above embodiment, but includes various modifications. For example, the above embodiment has been described in order to easily explain the present invention, and the present invention does not necessarily have all the configurations described.

For example, the motor 1 according to the above embodiment can be used not only as a drive motor for a side-mounted electric motorcycle as shown in FIG. 12 or a center-mounted electric motorcycle as shown in FIG. 13, but also as the power for various electric devices that have suitable driving force, such as an in-wheel electric motorcycle that is driven in the wheel and a small electric car.

Further, in the above embodiment, the motor 1 is configured to use the leaf spring material 14 to retain the thermistor 13 in the thermistor housing portion 15 of the insulator 11 and press the thermistor 13 against the winding coil 12, but for example, the thermistor 13 may be fixed to the thermistor housing portion 15 using an adhesive, or the thermistor 13 may be fixed to the thermistor housing portion 15 by screws.

Moreover, as long as the configuration can suppress deformation of the bus bar unit 7 due to resonance, the bus bar unit 7 can be fixed to the insulator 11 by using bolts, press fitting, or the like, without using the adhesive 7*f*.

What is claimed is:

1. A motor, comprising:

a cylindrical stator that comprises a cylindrical insulator with insulating properties in which a plurality of winding portions are arranged in a circumferential direction, and a plurality of winding coils provided on each winding portion of the insulator;

a rotor that is rotatably disposed inside the stator; and an annular bus bar unit that supplies power to the plurality of winding coils, wherein the bus bar unit is fixed to one end side of the insulator, the insulator comprises a receiving portion, the bus bar unit comprises a fixing portion provided with a through hole, and the receiving portion is fixed to the fixing portion by filling an adhesive with fluidity from the through hole in a state where the fixing portion is fitted to the receiving portion.

2. The motor according to claim 1, wherein the receiving portion is provided on an inner peripheral side of the insulator to protrude in a radially inner direction, and the fixing portion is provided on an inner peripheral side of the bus bar unit.

3. The motor according to claim 2, wherein the receiving portion and the fixing portion are provided to protrude in the radially inner direction to a position covering a part of the rotor.

4. The motor according to claim 2, wherein a plurality of the receiving portions and the fixing portions are arranged in the circumferential direction.

5. The motor according to claim 4, wherein the bus bar unit comprises a flange portion that connects the fixing portions to each other.

6. The motor according to claim 1, wherein the receiving portion is formed in a concave shape, and the fixing portion is formed in a protruding shape that fits into the receiving portion.

7. The motor according to claim 1, wherein the through hole is formed in a conical shape with a diameter decreasing in a fitting direction of the receiving portion.

8. The motor according to claim 1, comprising a housing inside which the stator is fixed, wherein the housing has an opening on a surface opposite to a side where the bus bar unit is attached, and a lid is attached to the opening by protruding one end of the rotor.

9. A manufacturing method for manufacturing the motor according to claim 1, the manufacturing method comprising:

a winding step of winding a wire around the insulator to form the winding coil;

an assembling step of assembling the bus bar unit to the insulator;

a fixing step of fixing an end portion of the wire and a bus bar terminal of the bus bar unit; and a bonding step of bonding the receiving portion of the insulator and the fixing portion of the bus bar unit with the adhesive.

* * * * *